United States Patent
Park

(10) Patent No.: US 9,360,974 B2
(45) Date of Patent: Jun. 7, 2016

(54) TOUCH PANEL AND METHOD OF MANUFACTURING THE SAME

(71) Applicant: LG INNOTEK CO., LTD., Seoul (KR)

(72) Inventor: Hoon Bae Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 172 days.

(21) Appl. No.: 14/014,845

(22) Filed: Aug. 30, 2013

(65) Prior Publication Data

US 2014/0102872 A1   Apr. 17, 2014

(30) Foreign Application Priority Data

Oct. 11, 2012   (KR) .................. 10-2012-0113203

(51) Int. Cl.
*G06F 3/044* (2006.01)

(52) U.S. Cl.
CPC ...... *G06F 3/044* (2013.01); *G06F 2203/04103* (2013.01)

(58) Field of Classification Search
CPC .................................. G06F 3/041; G06F 3/044
USPC .......................................................... 200/600
See application file for complete search history.

(56) References Cited

U.S. PATENT DOCUMENTS

| | | | |
|---|---|---|---|
| 2011/0001721 A1* | 1/2011 | Chiang et al. | 345/174 |
| 2011/0043465 A1* | 2/2011 | Huang et al. | 345/173 |
| 2011/0102370 A1* | 5/2011 | Kono | G06F 3/044 345/174 |
| 2011/0134073 A1* | 6/2011 | Ahn | 345/174 |
| 2011/0291987 A1* | 12/2011 | Wang et al. | 345/174 |
| 2012/0113042 A1* | 5/2012 | Bayramoglu et al. | 345/174 |

* cited by examiner

*Primary Examiner* — Edwin A. Leon
*Assistant Examiner* — Iman Malakooti
(74) *Attorney, Agent, or Firm* — Saliwanchik, Lloyd & Eisenschenk

(57) ABSTRACT

Disclosed are a touch panel and a method of manufacturing the same. The touch panel includes a substrate on which an active area and an inactive area surrounding the active area are defined; a first printing layer on the inactive area; a transparent electrode provided on the substrate to sense a position; and a second printing layer spaced apart from the substrate. A method of manufacturing a touch panel includes preparing a substrate on which an active area and an inactive area surrounding the active area are defined; printing a first printing layer on the inactive area of the substrate; preparing a transparent electrode provided on the substrate and on which the second printing layer is formed to sense a position; and bonding the transparent electrode with the substrate.

10 Claims, 4 Drawing Sheets

TOUCH PANEL AND METHOD OF MANUFACTURING THE SAME

CROSS-REFERENCE TO RELATED APPLICATION

This application claims the benefit under 35 U.S.C. §119 of Korean Patent Application No. 10-2012-0113203, filed Oct. 11, 2012, which is hereby incorporated by reference in its entirety.

BACKGROUND OF THE INVENTION

The disclosure relates to a touch panel and a method of manufacturing the same.

Recently, a touch panel, which performs an input function through the touch of an image displayed on a display device by an input device such as a stylus pen or a hand, has been applied to various electronic appliances.

The touch panel may be representatively classified into a resistive type touch panel and a capacitive type touch panel. In the resistive type touch panel, the position of the touch point is detected by detecting the variation of resistance according to the connection between electrodes when pressure is applied to an input device. In the capacitive type touch panel, the position of the touch point is detected by detecting the variation in capacitance when a finger of the user is touched on the capacitive type touch panel between electrodes. When taking into consideration the convenience of a fabrication scheme and a sensing function, the capacitive type touch panel has been recently spotlighted in a smaller model.

Characters such as company logs are formed on a bezel of the touch panel, and delamination phenomenon occurs between a substrate and a film adhering to the substrate due to the characters. Further, air bubbles are generated in a stepped portion due the characters so that the reliability of the touch panel is degraded.

BRIEF SUMMARY

The embodiment provides a light emitting device having improved reliability.

According to the embodiment, there is provided a touch panel including: a substrate on which an active area and an inactive area surrounding the active area are defined; a first printing layer on the inactive area; a transparent electrode provided on the substrate to sense a position; and a second printing layer spaced apart from the substrate.

According to the embodiment, there is provided a method of manufacturing a touch panel includes preparing a substrate on which an active area and an inactive area surrounding the active area are defined; printing a first printing layer on the inactive area of the substrate; preparing a transparent electrode provided on the substrate and on which the second printing layer is formed to sense a position; and bonding the transparent electrode with the substrate.

In the touch panel according to the embodiment, a character part is disposed on a transparent electrode rather than a top surface of the substrate. The character part may be formed by printing or depositing characters on the transparent electrode. Accordingly, a process of printing or depositing the characters on the substrate may be omitted.

Since the character part is disposed on the transparent electrode spaced apart from the substrate, step difference may be prevented from occurring upon adhesion between the substrate and the transparent electrode. Accordingly, the genera-tion of air bubbles caused by the step difference can be prevented so that the reliability of the touch panel can be improved.

Further, the character part is spaced apart from the substrate so that a depth between the top surface of the substrate and the character part can be increased. Accordingly, the sense of depth can be impressed to the character part, and the degree of freedom in design of the touch panel can be improved.

DETAILED DESCRIPTION

Figure 1:
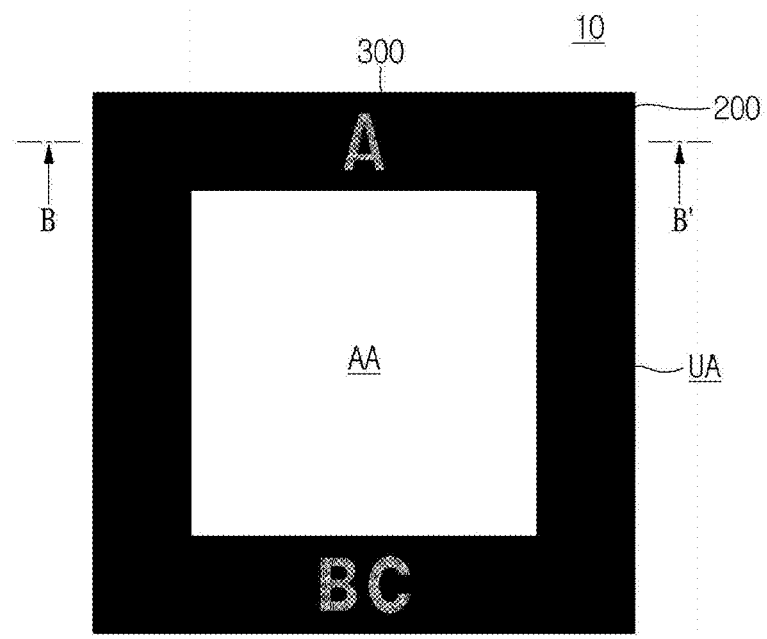
FIG. 1 is a plan view schematically showing a touch panel according to an embodiment.

In the following description of the embodiments, it will be understood that, when a layer (film), a region, a pattern or a structure is referred to as being "on" or "under" another layer (film), region, pattern or structure, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be exaggerated, omitted or schematically drawn for the purpose of convenience or clarity. In addition, the size of each layer (film), region, pattern or structure does not utterly reflect an actual size.

Hereinafter, the embodiment will be described in detail with reference to accompanying drawings.

Figure 2:
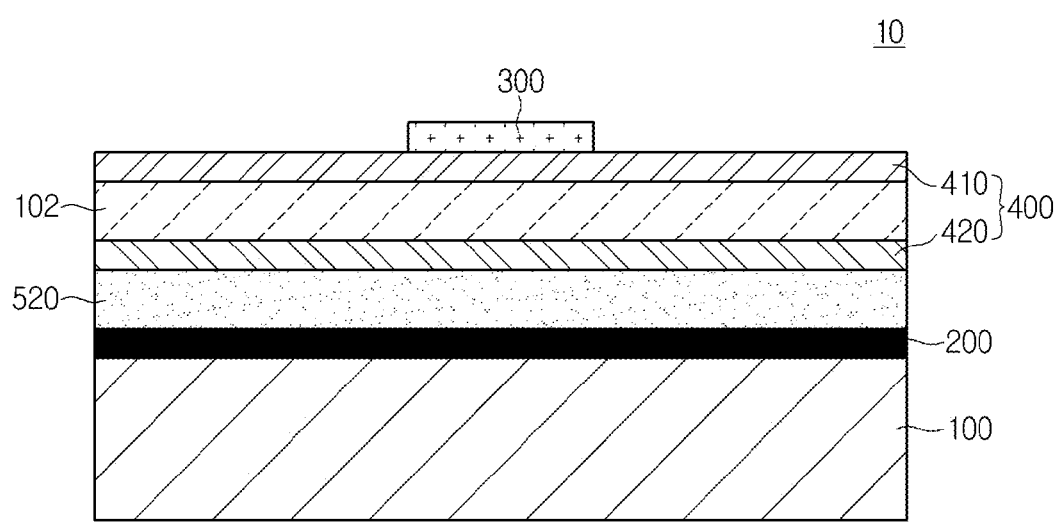
FIG. 2 is a sectional view taken along line B-B' of FIG. 1.
Figure 3:
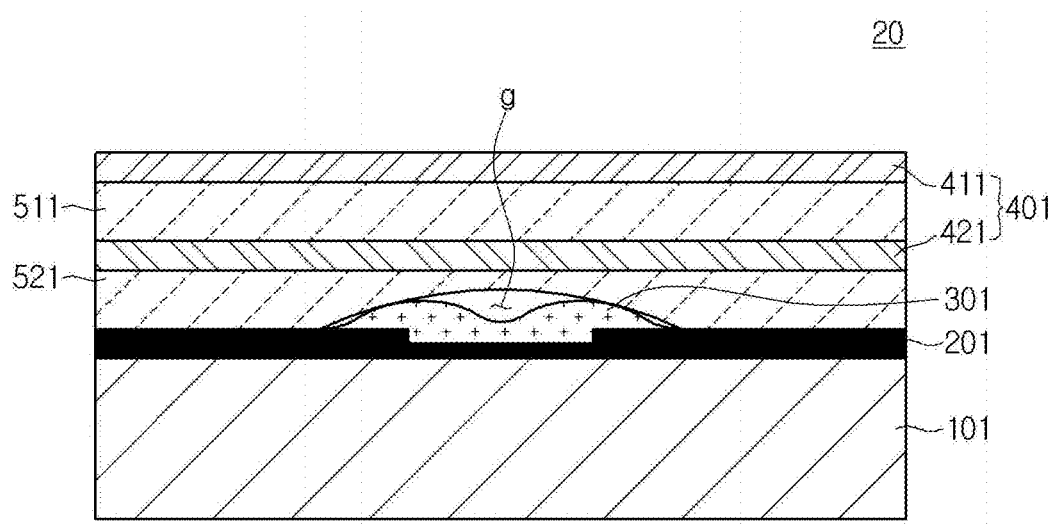
FIG. 3 is a plan view showing a touch panel according to the related art.

Hereinafter, a touch panel and a method of manufacturing the same according to one embodiment will be described in detail with reference to FIGS. 1 to 3. FIG. 1 is a plan view schematically showing a touch panel according to an embodiment. FIG. 2 is a sectional view taken along line B-B' of FIG. 1. FIG. 3 is a plan view showing a touch panel according to the related art.

Referring to FIGS. 1 and 2, a touch panel 10 according to the present embodiment includes a substrate 100 in which an active area AA to detect the position of an input device (e.g., finger) and an inactive area UA provided at a peripheral portion of the active area AA are defined.

The substrate 100 may include various materials to support a transparent electrode 400 and an adhesive layer 520 formed on the substrate 100. For instance, the substrate 100 may include a glass substrate or a plastic substrate.

The active area AA and the inactive area UA of the substrate 100 may be provided therein with a transparent electrode 210 that may sense the input device. In addition, the inactive area UA may be provided therein with a wire electrically connecting transparent electrode 400. Further, the inactive area UA may be provided therein with an external circuit connected to the wires 300. The inactive area UA may be provided therein with a first printing layer 200.

The first printing layer 200 may be formed in the inactive area UA of the substrate 100 by printing. In detail, the first printing layer 200 may be coated with a material having a predetermined color so that a wire and a printed circuit board connecting the wire to external circuits cannot be seen from the outside. The first printing layer 200 may have a color suitable for a desired outer appearance thereof. For example, the first printing layer 200 may include black pigments to represent a black color.

The transparent electrode 400 may be disposed on the substrate 100. The transparent electrode 400 may sense whether the input device such as the finger is touched.

Referring to FIG. 2, the transparent electrode 400 may include a first transparent electrode 410 and a second transparent electrode 420.

The first transparent electrode 410 and the second transparent electrode 420 may have various shapes to sense the touch of input device such as the finger.

The first transparent electrode 410 and the second transparent electrode 420 may include a transparent conductive material allowing electricity to flow without interrupting the transmission of light. To this end, the first transparent electrode 410 and the second transparent electrode 420 may include various materials such as metallic oxide including indium tin oxide, indium zinc oxide, copper oxide, tin oxide, zinc oxide, or titanium oxide, a carbon nano-tube (CNT), and a conductive polymer material.

Meanwhile, the first and second transparent electrodes 410 and 420 are formed in a transparent electrode base 102 such as a poly (ethylene terephthalate) (PET) film.

Although the drawing shows that the first and second transparent electrodes 410 and 420 are disposed on different layers, respectively, the embodiment is not limited thereto. Accordingly, the first and second transparent electrodes 410 and 420 may be disposed on the same layer.

If the input device such as a finger is touched on the touch panel, the difference in capacitance is made in a portion touched by the input device, and the touched portion having the difference in capacitance may be detected as a touch point.

The adhesive layer 520 may bond the substrate 100 with transparent electrode base 102. For example, the adhesive layer 520 may include an optically clear adhesive (OCA).

Meanwhile, the second printing layer 300 includes characters such as company logos or symbols. A user of the touch panel may acquire information through the second printing layer 300.

The second printing layer 300 is provided on the second transparent electrode 400. The second printing layer 300 may be provided at only an upper portion or a lower portion of the transparent electrode 400. In detail, the second printing layer 300 may be disposed on the first transparent electrode 410. The second printing layer 300 may directly make contact with the first transparent electrode 410. The second printing layer 300 is spaced apart from the substrate 100. The second printing layer 300 is disposed at a region corresponding to the inactive area UA.

The second printing layer 300 may be formed by printing or depositing characters on the transparent electrode 400. Accordingly, a process of printing or depositing the characters on the substrate 100 may be omitted.

The second printing layer 300 may be disposed on the transparent electrode 400 which is spaced apart from the substrate 100 to prevent step difference from occurring upon adhesion between the substrate 100 and the transparent electrode 400. Accordingly, the generation of air bubbles caused by the step difference can be prevented so that the reliability of the touch panel can be improved.

Further, the second printing layer 300 is spaced apart from the substrate 100 so that a depth between the top surface of the substrate 100 and the second printing layer 300 may be increased. Accordingly, the sense of depth can be impressed to the second printing layer 300, and the degree of freedom in design of the touch panel may be improved.

Meanwhile, although not shown in the drawings, the touch panel according to the embodiment may further include an electrode base, on which the transparent electrode 400 is formed, including one surface facing the substrate 100 and the other surface opposite to the one surface. In this case, the touch panel according to the embodiment may further include an adhesive layer bonding the substrate 100 with the electrode base. The second printing layer 300 may be disposed on one or both of the one surface and the opposite surface.

Meanwhile, referring to FIG. 3, in the touch panel 20 according to the relate art, a second printing layer 310 is directly formed on a substrate 101. Thus, a stepped portion g is formed between adhesive layers 511 and 521 bonding the substrate 101 with an transparent electrode 401 and the second printing layer 300. Air bubbles may be generated and the delamination phenomenon may occur in the stepped portion g.

Hereinafter, a touch panel according to another embodiment will be described in more detail with reference to FIGS. 4 to 6. In the following description, the details of structures and components the same as those described above or extremely similar to those described above will be omitted except for only structures and components making the difference from those described above for the purpose of clear and simple explanation.

FIGS. 4 to 8 are sectional views showing a touch panel according to another embodiment.

Figure 4:
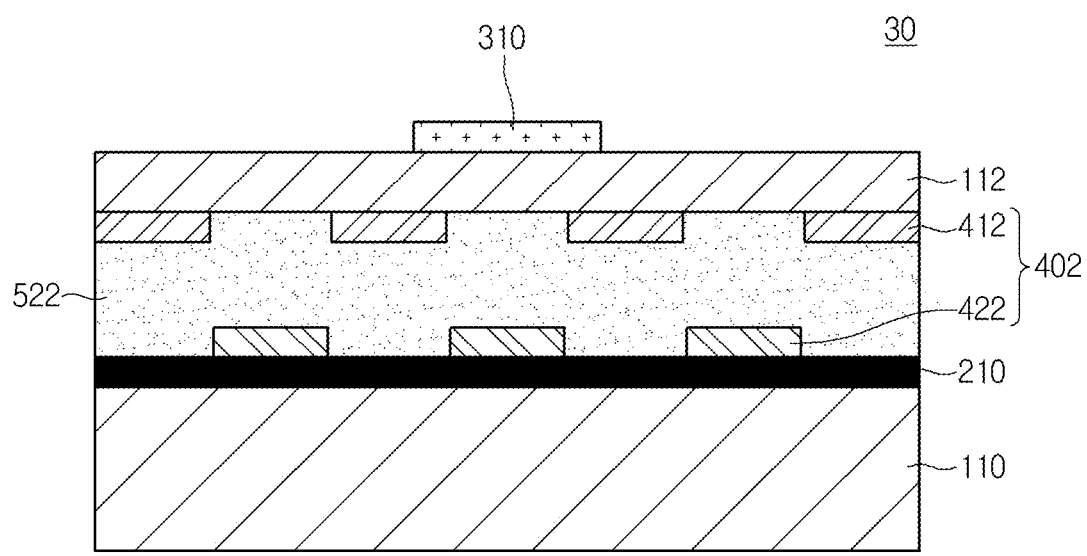
FIGS. 4 to 8 are sectional views showing a touch panel according to another embodiment.

First, referring to FIG. 4, the touch panel 30 according to the embodiment include an electrode base 112 spaced apart from a substrate 110. The transparent electrode 402 includes a first transparent electrode 412 and a second transparent electrode 422, and the first transparent electrode 412 is disposed on one surface of the electrode base 112. The second transparent electrode 422 is disposed on the substrate 110. In this case, the second printing layer 310 is disposed on the electrode base 112. In detail, the second printing layer 310 may be disposed on the other surface of the electrode base 112 where the first transparent electrode 412 is not formed. The substrate 110 may be bonded with the electrode base 112 by an adhesive layer 522.

Meanwhile, although it has been illustrated in the drawing that the first transparent electrode 412 is disposed on a bottom surface of the electrode base 112, the embodiment is not limited thereto. For instance, the first transparent electrode 412 may be disposed on a top surface of the electrode base 112. In this case, the second printing layer 310 may be formed on the first transparent electrode 412.

Figure 5:
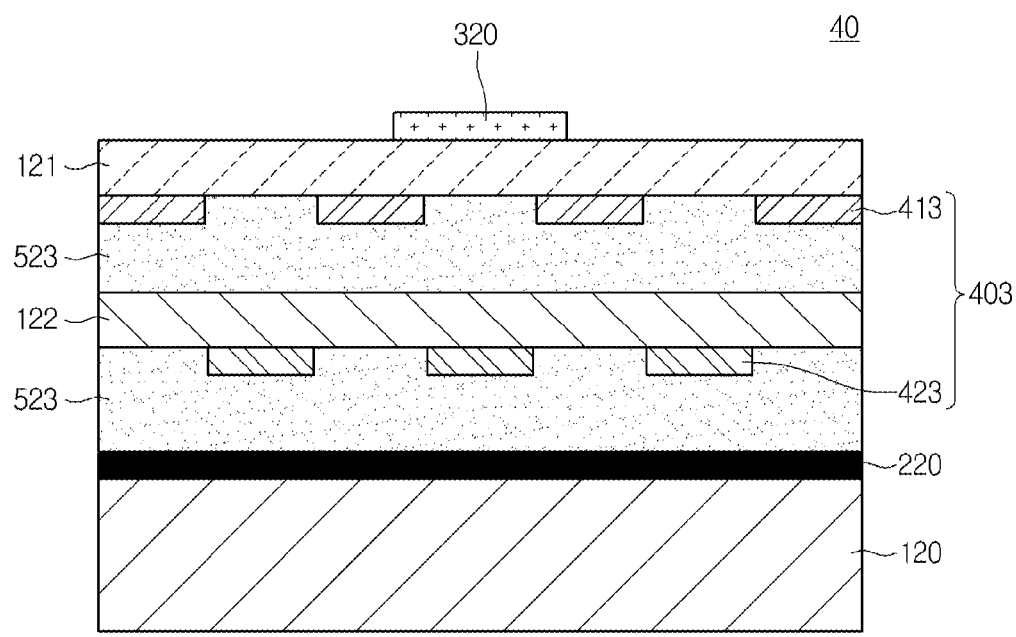

Referring to FIG. 5, the touch panel 400 according to the embodiment includes a first electrode base 121 and a second electrode base 122 spaced apart from the substrate 120. A transparent electrode 403 includes a first transparent electrode 413 and a second transparent electrode 423. The first transparent electrode 413 is disposed on a bottom surface of the first electrode base 121. The second transparent electrode 423 is disposed on a bottom surface of the second electrode base 122. In this case, the second printing layer 320 is disposed on the first electrode 121. In detail, the second printing layer 320 may be disposed on a surface of the first electrode base 121 where the first transparent electrode 413 is not formed. Adhesive layers 523 may be disposed between the substrate 120 and the second electrode base 122 and between the first electrode base 121 and the second electrode base 122, respectively.

Figure 6:
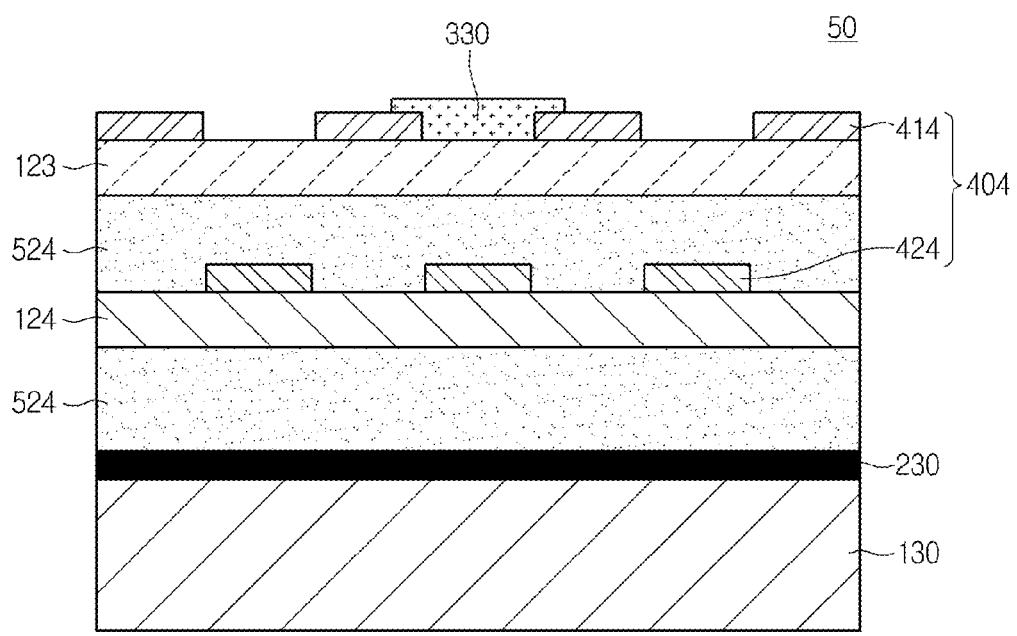
Figure 7:
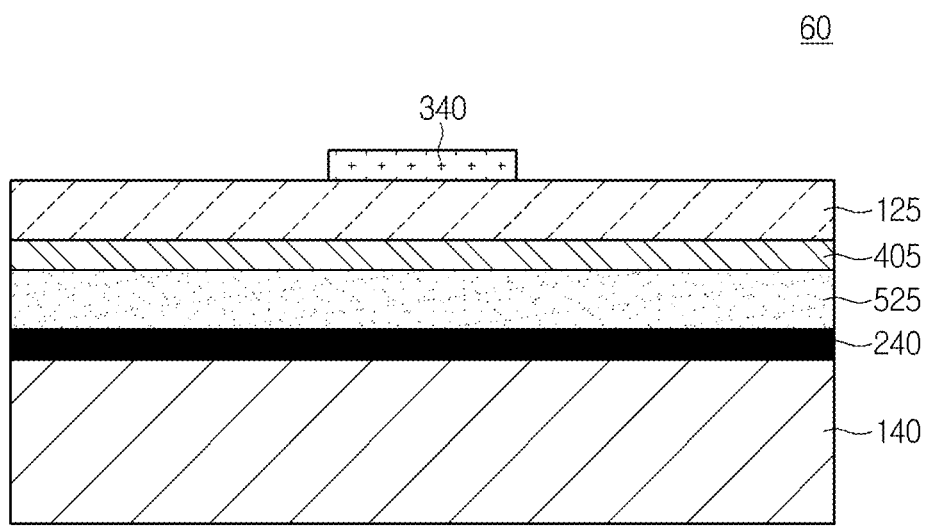

Referring to FIG. 6, the touch panel 50 according to the embodiment includes a first electrode base 123 and a second electrode base 124 spaced apart from the substrate 120. A transparent electrode 404 includes a first transparent electrode 414 and a second transparent electrode 424. The first transparent electrode 414 is disposed on a top surface of the first electrode base 123. The second transparent electrode 424 is disposed on a top surface of the second electrode base 124. In this case, the second printing layer 330 may be formed on the first transparent electrode 414. Adhesive layers 524 may be disposed between the substrate 130 and the second electrode base 124 and between the first electrode base 123 and the second electrode base 124, respectively. Referring to FIG. 7, the touch panel 60 according to the embodiment includes an electrode base 125 spaced apart from the substrate 140. A transparent electrode 405 is formed on a bottom surface of the electrode base 125 as one layer. That is, x axis and y axis transparent electrodes may be formed on one surface of the electrode base 125 at one time. A second printing layer 340 may be formed on a top surface of the electrode base 125. An adhesive layer 525 may be disposed between the electrode base 125 and the substrate 140.

Figure 8:
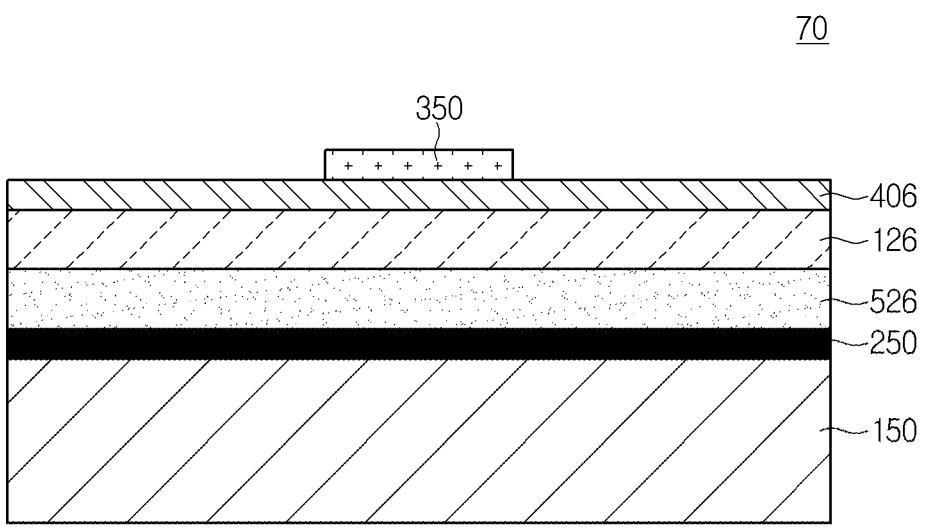

Referring to FIG. 8, the touch panel 70 according to the embodiment includes an electrode base 126 spaced apart from the substrate 150. A transparent electrode 406 is formed on a top surface of the electrode base 126 as one layer. That is, x axis and y axis transparent electrodes may be formed on one surface of the electrode base 126 at one time. A second printing layer 340 is formed on a top surface of the transparent electrode 406. An adhesive layer 526 may be disposed between the electrode base 126 and the substrate 150.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate on which an active area and an inactive area surrounding the active area are defined;
a first printing layer on the inactive area;
a transparent electrode provided on the substrate to sense a position;
an electrode base spaced apart from the substrate, and including one surface opposed to the substrate and an opposite surface opposite to the one surface;
an adhesive layer disposed between the substrate and the electrode base; and
a second printing layer spaced apart from the substrate;
wherein the first printing layer is in direct physical contact with the substrate,
wherein the transparent electrode is disposed on the electrode base,
wherein the second printing layer is disposed on the electrode base or the transparent electrode,
wherein the second printing layer is disposed at a region corresponding to the inactive area of the substrate, and
wherein the substrate, the first printing layer, the adhesive layer, and the transparent electrode are sequentially stacked.

2. The touch panel of claim 1,
wherein the transparent electrode is in direct physical contact with the electrode base, and
wherein the second printing layer is in direct physical contact with the transparent electrode.

3. The touch panel of claim 1, wherein the second printing layer is disposed on one of the one surface and the opposite surface.

4. The touch panel of claim 1, wherein the second printing layer is disposed on both of the one surface and the opposite surface.

5. The touch panel of claim 1, wherein the transparent electrode comprises a first transparent electrode and a second transparent electrode,
the first transparent electrode is disposed on the opposite surface of the electrode base,
the second transparent electrode is disposed on the one surface of the electrode base, and
the second printing layer is disposed on the first transparent electrode.

6. The touch panel of claim 1, wherein the transparent electrode comprises a first transparent electrode and a second transparent electrode,
the first transparent electrode and the second transparent electrode are disposed on the one surface of the electrode base, and
the second printing layer is disposed on the opposite surface of the electrode base.

7. The touch panel of claim 1, wherein the transparent electrode comprises a first transparent electrode and a second transparent electrode,
the first transparent electrode and the second transparent electrode are disposed on the opposite surface of the electrode base, and
the second printing layer is disposed on the transparent electrode.

8. The touch panel of claim 1, further comprising:
a first transparent electrode on the electrode base; and
a second transparent electrode on the substrate,
wherein the second printing layer is disposed on the electrode base.

9. The touch panel of claim 1, further comprising:
a second electrode base spaced apart from the substrate;
a first transparent electrode on the electrode base; and
a second transparent electrode on the second electrode base,
wherein the second printing layer is disposed on the electrode base or the second electrode base.

10. The touch panel of claim 1, further comprising:
a second electrode base spaced apart from the substrate;
a first transparent electrode on the electrode base; and
a second transparent electrode on the second electrode base,
wherein the second printing layer is disposed on the first transparent electrode or the second transparent electrode.

* * * * *